United States Patent [19]

de Almeida Borges

[11] Patent Number: 5,251,412

[45] Date of Patent: Oct. 12, 1993

[54] PANTOGRAPHICALLY MOVABLE SUPPORT APPARATUS

[76] Inventor: Carlos A. de Almeida Borges, Rua Nova Jerusalem, 475, Rio de Janeiro, Brazil

[21] Appl. No.: 820,249

[22] Filed: Jan. 14, 1992

[30] Foreign Application Priority Data

Feb. 5, 1991 [BR] Brazil ............................... PI91 00456

[51] Int. Cl.⁵ ........................................... E04H 12/18
[52] U.S. Cl. ...................................... 52/109; 52/645
[58] Field of Search ................... 52/27, 109, 645, 646, 52/63, 222, 273

[56] References Cited

U.S. PATENT DOCUMENTS

| | | | |
|---|---|---|---|
| 4,015,377 | 4/1977 | Jastrzebski | 52/79.2 X |
| 4,546,591 | 10/1985 | Beltz | |
| 4,612,848 | 9/1986 | Pollack | 52/645 X |
| 4,628,560 | 12/1986 | Clevett et al. | 52/109 X |
| 4,899,507 | 2/1990 | Mairlot | 52/222 |

FOREIGN PATENT DOCUMENTS

| | | |
|---|---|---|
| 7805402 | 8/1978 | Brazil . |
| 2163206 | 2/1986 | United Kingdom . |
| WO86/01847 | 3/1986 | World Int. Prop. O. . |

*Primary Examiner*—Carl D. Friedman
*Assistant Examiner*—Creighton Smith
*Attorney, Agent, or Firm*—Staas & Halsey

[57] ABSTRACT

A support apparatus has lengthwise beams which are coupled together by a plurality of cross members. The beams are hingedly fixed to the plurality of cross members via intermediate members. The apparatus is pantographically movable, and thus the volume of the apparatus can be reduced for transport. Two such apparatus can be coupled together to form a support system on which a cover is held. The cover is supported on a number of arcuate supports which extend between the beams, the ends of the arcuate supports being folded over to hold the cover in place.

4 Claims, 5 Drawing Sheets

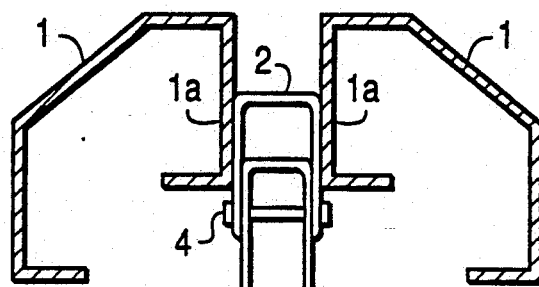
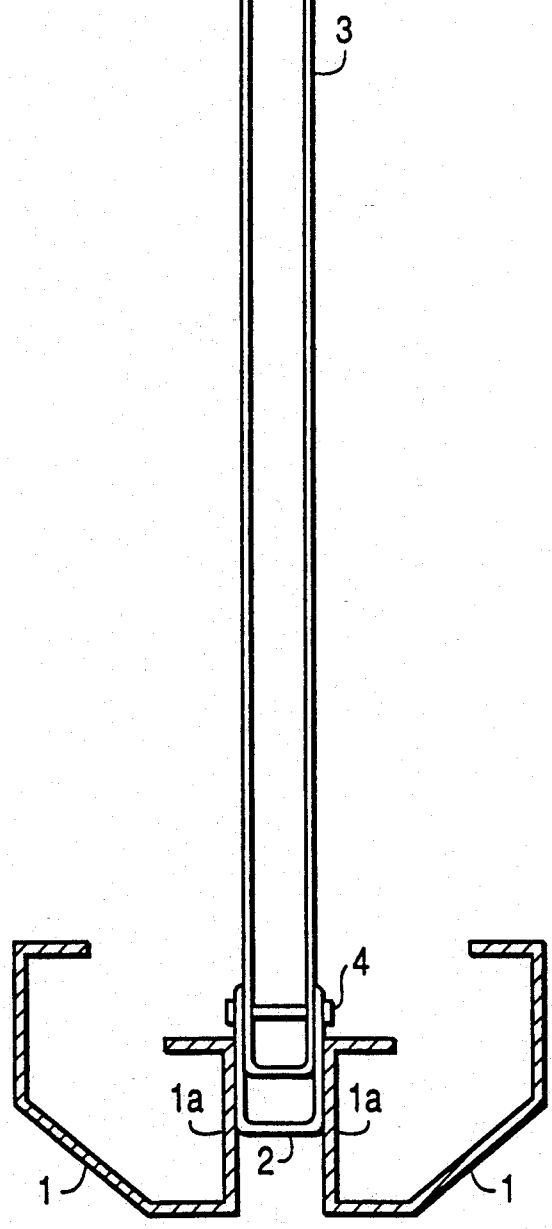

PANTOGRAPHICALLY MOVABLE SUPPORT APPARATUS

BACKGROUND OF THE INVENTION

1. Field of the Invention

The present invention relates to a support apparatus and a support system.

Certain embodiments of the present invention are concerned with improving the arrangement described in Brazil Patent No. PI78 05402 issued on Apr. 26, 1986, to the present inventor. This Brazilian patent relates to a roof covering which uses convex flexible sheets, the edges of which are received in grooves. The center point of the convex shape rests on a horizontal base.

According to a first aspect of the present invention, there is provided a support apparatus including lengthwise beams coupled together by a plurality of first members. The beams are coupled to the first members in such a manner that the beams are pantographically displaceable, thereby reducing the volume of the support apparatus.

The reduction in volume facilitates transportation of the support apparatus to the site where it is required, whereafter the apparatus can be expanded for use.

The expression "pantographically" displaceable or movable used in this specification means that the lengthwise beams can move relative to each other like the two opposite sides of a parallelogram having pivot joints.

According to a second aspect of the invention there is provided a support system including two support apparatus as described above. Each apparatus is arranged with its lengthwise beams parallel to one another and the system includes cross members which secure the two apparatus together. Preferably, arcuate supports extend between the two apparatus and support a cover.

Using this support apparatus, the cover can be provided at the work place economically, since the apparatus is quick and easy to assemble and disassemble. The cover, which may constitute a roof and may be a flexible plate of, e.g., metal or the like, may be arcuately supported by this arrangement.

Preferably at least one of said arcuate supports has an extended end portion which is foldable over the edge of said cover to hold the cover in place.

Thus, the cover can be fixed without screws or similar fastenings so that thermal expansion can take place without warping or stressing of the cover. This is because relative movement between the cover and the arcuate supports is possible while still retaining the cover substantially in place. Lateral movement of the cover is restricted by the folded end portions of the arcuate supports and no separate lengthwise fastening is required.

Thus, according to a further aspect, the invention provides a support system including two longitudinally extending support apparatus laterally spaced from each other, a plurality of longitudinally spaced traverse supports extending between the two apparatus, and a cover carried by the transverse supports, the transverse supports having end portions which are bent over the edges of the cover to hold the cover in place. The transverse supports are preferably arcuate.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 shows a cross-section of the support apparatus according to the present invention along line B—B of FIG. 4;

DESCRIPTION OF THE PREFERRED EMBODIMENTS

Figure 2:
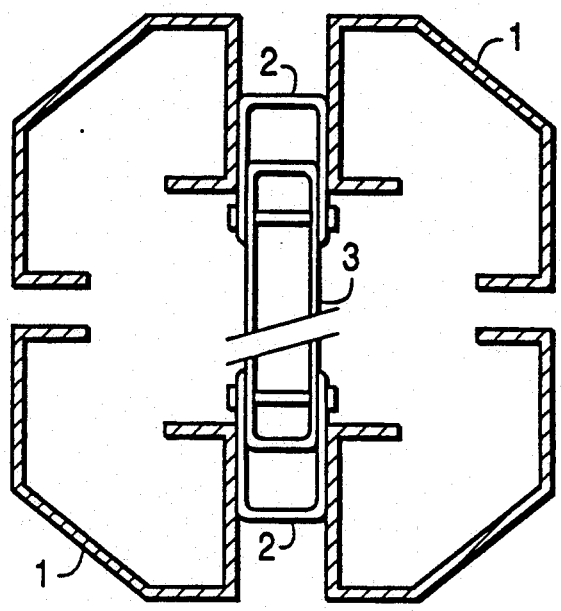
FIG. 2 shows a cross-section of the apparatus along line A—A of FIG. 3.
Figure 3:
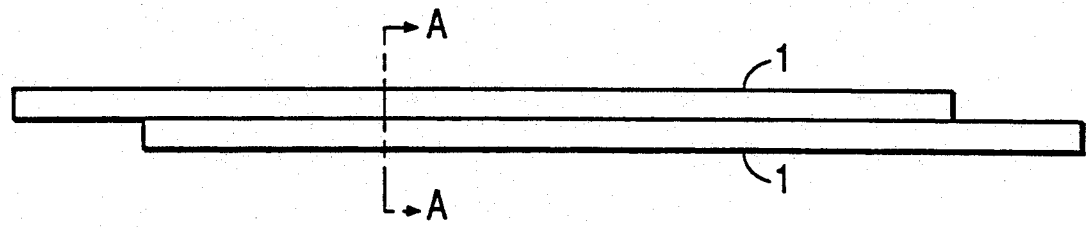
FIG. 3 shows the apparatus when folded.
Figure 4:
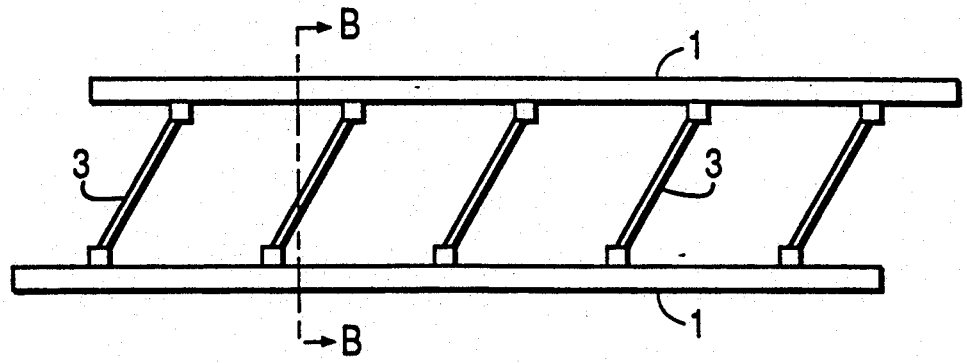
FIG. 4 shows the apparatus when being opened.

Apparatus embodying the present invention will now be described with reference to FIGS. 1 to 11.

As can be seen from FIG. 1, the inner edges of two supporting beams 1 are connected to an intermediate piece 2 which in turn is hingedly connected by a screw pin and nut 4 to one end of a first straight member 3. The other end of the first straight member 3 is in turn hingedly connected by a screw pin and nut 4 to an intermediate piece 2 which is connected to the inner edges of two supporting beams 1 opposite the other two supporting beams 1.

A number of these intermediate pieces 2 is arranged between the first and second pairs of supporting beams, and a pantographically movable structure is formed. This can be seen particularly in FIG. 3 which shows the apparatus in a folded form for transport and FIG. 4 which shows the apparatus being opened.

The apparatus is transported in its closed position and taken to the work place where it is to be used and opened out. Second straight members 5, identical to first straight members 3, are then inserted between the two beams 1 as shown in FIG. 5 to give rigidity to the arrangement.

Figure 5:
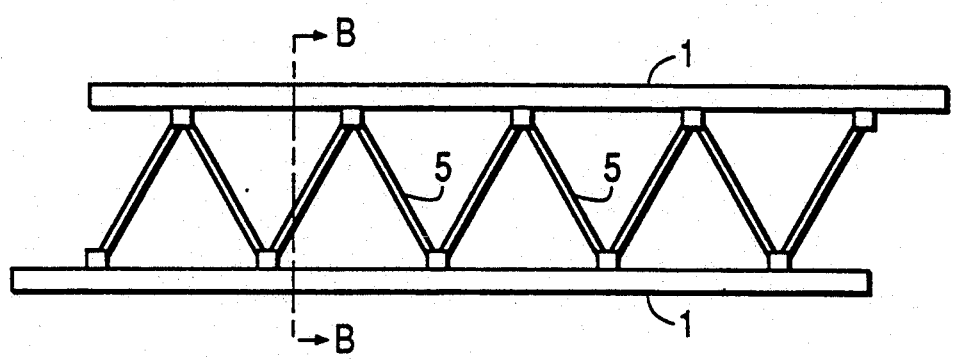
FIG. 5 shows the apparatus after additional member have been inserted.
Figure 6:
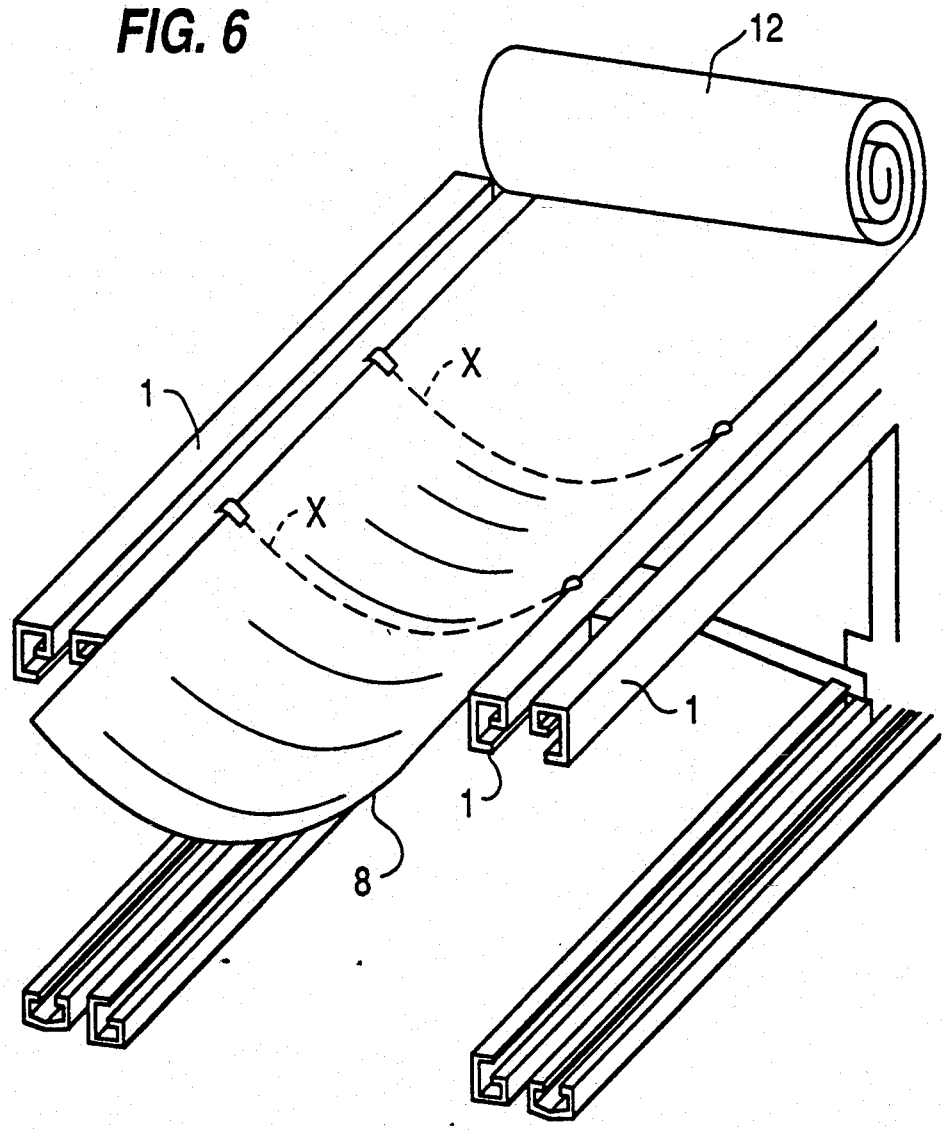
FIG. 6 shows a support system incorporating two apparatus, as shown in FIGS. 1 to 5 support a cover.
Figure 7:
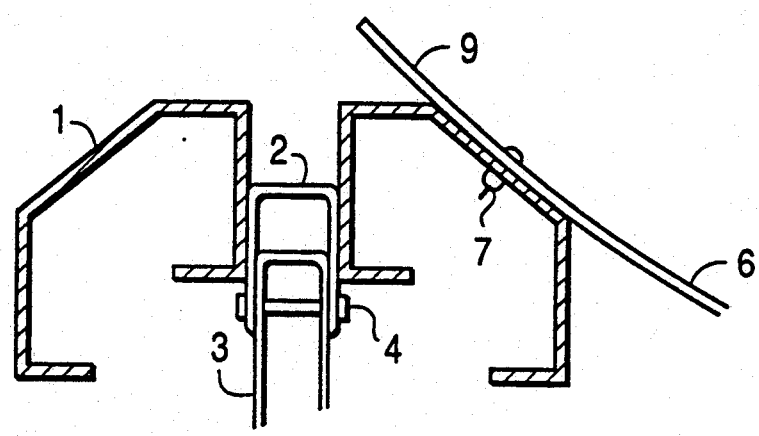
FIGS. 7 to 9 illustrate the various steps taken to support the cover between the two apparatus.
Figure 8:
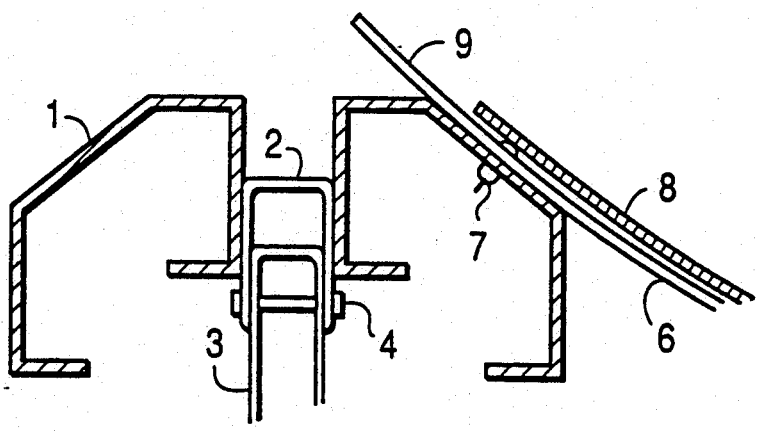
Figure 9:
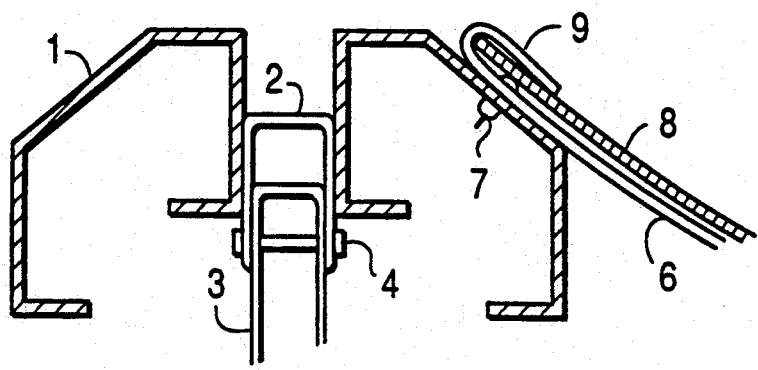
Figure 10:
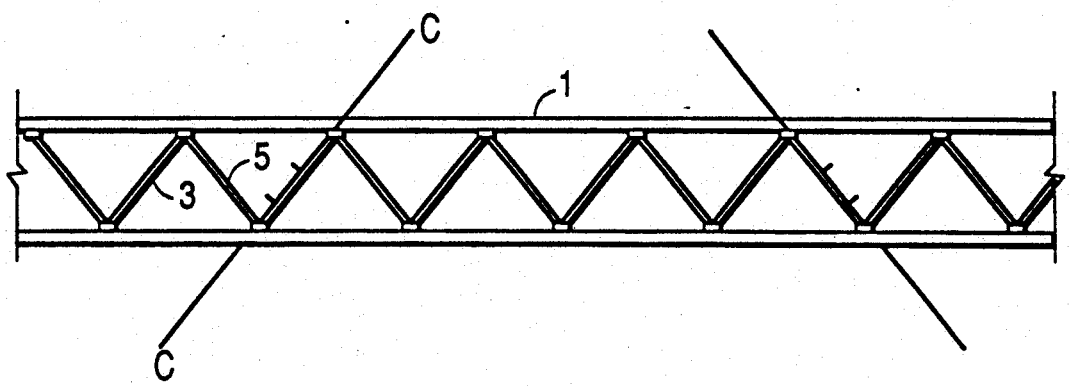
FIG. 10 shows the apparatus of FIG. 5 which is attached to a parallel apparatus along the lines shown.
Figure 11:
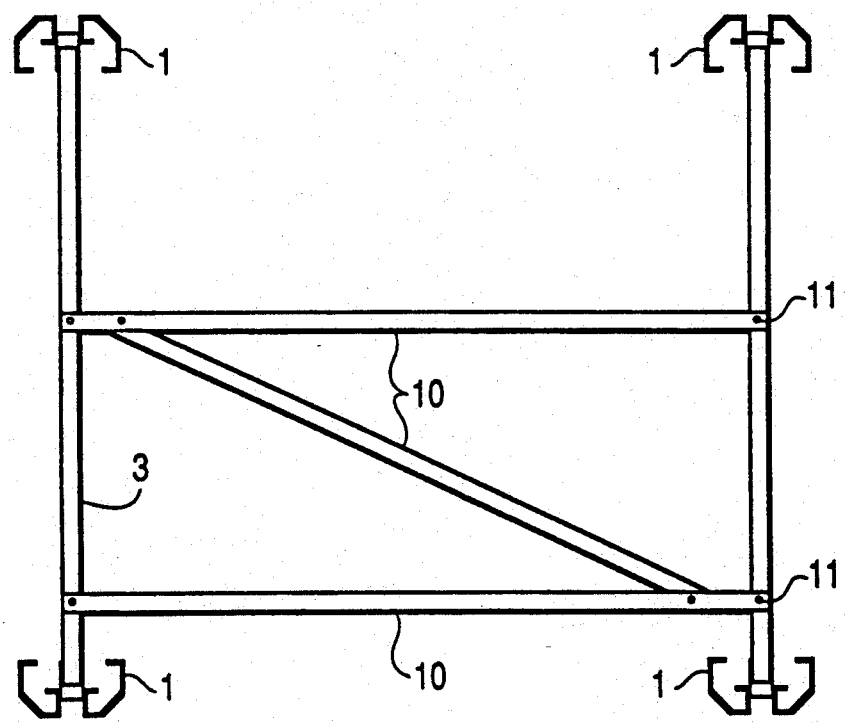
FIG. 11 is a cross-sectional view of two contiguous beams, along line C—C FIG. 10.

Two sets of apparatus as shown in FIG. 5 can be coupled together as shown in FIGS. 10 and 11 by third straight members or cross beams 10. Two parallel cross beams 10 extend between two corresponding straight members 3 or 5, one member being from each set of apparatus. Screws 11 affix the cross beams 10 to the straight members 3, 5. A support cross beam member 10 is arranged to extend between two parallel cross beam members 10. More than one such set of cross beams 10 may be used to attach the two sets of apparatus together. As seen in FIG. 10 two such sets of cross-beams 10 are provided.

As can be seen from FIGS. 6 to 9, the two connected apparatus can be used to support a cover in the form of a curved metallic plate or plates 8. To support the plates, arcuate supports 6 are fastened using rivets 7, at regular intervals along the supporting beams 1. The arcuate supports 6 are in the shape of curved strips which extend between two opposed supporting beams 1, one from each apparatus. The metallic plates 8 are laid along the arcuate supports 6 and remain in place as a result of the weight of the plates 8 themselves. For additional rigidity, the edges 9 of the arcuate supports 6 are then bent over so as to lie on top of the plates 8 and provide a secure holding of the cover 8. The length of the arcuate supports 6 exceeds the width of the plate or plates 8 so that the ends of the arcuate supports 6 can be bent over the plates 8. The weight of the plates 8 holds them in place while the edges of the arcuate supports 6 are bent over the plates 8.

The plates 8 are either unreeled from a roll 12 onto the support system or are cut out along lines X at the arcuate supports 6. The bending of the edges at each arcuate support 6 then takes place after the plates 8 are put in place.

This system is advantageous over that of Brazilian Patent No. PI78 05402 as the supporting apparatus of the present invention can be reduced to a fifth of its assembled size for transportation. Obviously this results in a substantial decrease in transportation costs.

In addition, the system provides for an advantageous fixing of the channel or cover to the system. This is because the cover placed on the arcuate supports is held in place by the bent over edges of the arcuate supports. The bent over edges prevent displacement or disturbance of the system due to thermal variations.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to that fall within the scope of the invention and the appended claims.

I claim:

1. Support apparatus, comprising:
    first and second, parallel opposed lengthwise beams coupled together by a plurality of first members, the beams being coupled to said first members to be pantographically movable relative to each other between a first, folded position to a second, open position, and a volume of the support apparatus is reduced from the second, open position to the first, folded position,
    wherein the support apparatus is in the second, open position when in use, and further includes a plurality of second members arranged to extend between said lengthwise beams to maintain said support system in the second, open position,
    wherein two of said apparatus are arranged parallel to each other, and further comprising third members which secure one of said apparatus to the other,
    wherein arcuate supports extend between an upper beam of each of the two apparatus and support a cover, and
    wherein said arcuate supports are longitudinally spaced from one another and define a concave surface on which said cover is supported.

2. Support apparatus, comprising:
    first and second, parallel opposed lengthwise beams coupled together by a plurality of first members, the beams being coupled to said first members to be pantographically movable relative to each other between a first, folded position to a second, open position and a volume of the support apparatus is reduced from the second, open position to the first, folded position,
    wherein the support apparatus is in the second, open position when in use, and further includes a plurality of second members arranged to extend between said lengthwise beams to maintain said support system in the second, open position,
    wherein two of said apparatus are arranged parallel to each other, and further comprising third members which secure one of said apparatus to the other,
    wherein arcuate supports extend between an upper beam of each of the two apparatus and support a cover, and
    wherein at least one of said arcuate supports has an outer edge which is folded over a portion of said cover to hold said cover in place.

3. A support system, comprising: two longitudinally extending pantographically movable support apparatus laterally spaced from each other, each support including a lengthwise beam, a plurality of longitudinally spaced traverse supports extending between the two apparatus and being attached to the two beams, and a cover carried by the transverse supports, the transverse supports having edges which are bent over portions of the cover to hold the cover in place.

4. A support system as claim in claim 3, wherein said cover is one of unreeled from a roll and cut out on the support system.

* * * * *